Dec. 22, 1931.   W. B. THOMAS ET AL   1,837,346

PIPE CLOSURE

Filed June 24, 1930

Inventors.
Wayne B. Thomas
Vernon L. Sprague
Kwis Hudson & Kent
attys.

Patented Dec. 22, 1931

1,837,346

UNITED STATES PATENT OFFICE

WAYNE B. THOMAS, OF YOUNGSTOWN, AND VERNON L. SPRAGUE, OF WARREN, OHIO, ASSIGNORS TO THE NILES STEEL PRODUCTS COMPANY, OF NILES, OHIO, A CORPORATION OF OHIO

PIPE CLOSURE

Application filed June 24, 1930. Serial No. 463,400.

This invention relates to improvements in pipe closures, particularly closures for heavy metal pipes, the interior surfaces of which must be kept clean and dry.

One of the objects of the invention is the provision of a pipe closure of the character indicated which shall be of low cost and capable of being quickly and easily applied or removed, but not subject to being dislodged unintentionally.

Another object is the provision of a closure of this kind which shall be capable of excluding all moisture from the interior of the pipe and from the end surfaces thereof.

Another object is the provision of a closure which shall not interfere with the use of grappling hooks of ordinary construction such as are customarily employed upon cranes for handling heavy metal pipe.

Figure 1:
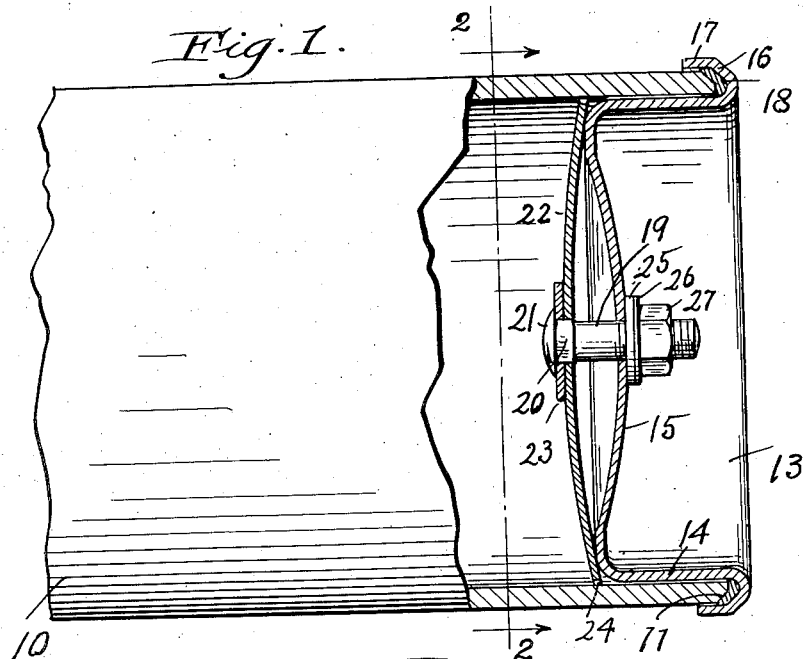

Other objects and features of novelty will appear as we proceed with the description of that embodiment of the invention which, for the purposes of the present application, we have illustrated in the accompanying drawings, in which Figure 1 is a side elevational view of an end portion of a pipe with my closure applied thereto, the view being taken partially in central, longitudinal section.

Figure 2:
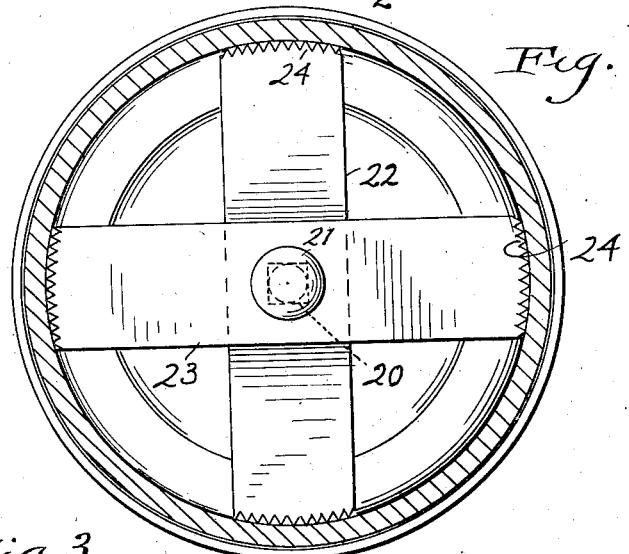
Figure 3:
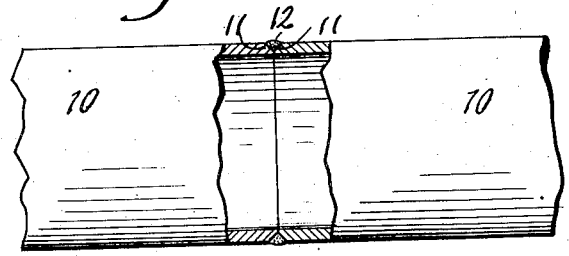

Fig. 2 is a transverse sectional view taken substantially on the line 2—2 of Fig. 1, and Fig. 3 is an elevational view on a smaller scale, with parts broken away to show a joint between two sections of a pipe line composed of bevel ended pipe sections to which our invention is particularly applicable in certain of its aspects.

The pipe closure of the present invention is intended particularly for use in connection with pipes that are to be employed in constructing gasoline pipe lines. Obviously a pipe line of this character to be operated with success must be entirely free of dirt or foreign material of any kind, and free of moisture or rust resulting from moisture. Hence in practice the interior walls of the pipe, after manufacture, are very thoroughly and carefully cleaned and dried. In order to keep them in that condition up to the moment of laying, our pipe closures are applied to both ends immediately after the cleaning and drying operation. The walls of these pipes are thick, and each section is forty feet or more in length and therefore quite heavy. In order to handle them economically a crane must be employed. In so doing, the pipe is generally lifted by grappling hooks which take into its ends. Our closure is so constructed as not to interfere with the use of such hooks, that is to say it is cup-shaped with side walls parallel to the walls of the pipe and deep enough to accommodate the grappling hooks.

In the drawings, 10 indicates a metal pipe which is constructed preferably of welded steel tubing of heavy gauge. The ends of each pipe section are beveled off, as at 11, in order to receive welding metal 12 when, in laying a pipe line, a joint is made between the adjacent ends of two pipe sections by welding them together as shown in Fig. 3.

The present invention comprises essentially a closure member 13 of cup shape, with a cylindrical side wall 14 which is parallel with the side wall of the pipe and fits fairly snugly therewithin. The bottom of the cup-shaped member is preferably dished upwardly, as indicated at 15, whereby it is strengthened and made capable of resisting without distortion the pressure exerted for locking the member in place, as will presently appear. At its upper edge the periphery of the cup-shaped member 15 is formed with an outwardly extending flange having an inclined portion 16 which is substantially parallel to the bevel 11 on the pipe. There may be also a further rebent portion 17 which is substantially parallel with the main wall of the pipe. In the inclined annular socket provided by the flanged rim of the cup, and particularly the inclined portion 16 thereof, we mount a soft rubber gasket 18 which, when the cup is firmly pressed into the pipe, is expanded to cover completely the end surface thereof, and thoroughly seal the pipe against entrance of moisture.

The bottom 15 of the cup-shaped portion is centrally perforated to take a bolt 19 of the nature of a carriage bolt, that is having a squared portion 20 adjacent the head 21. Two flexible steel straps 22 and 23 are provided with squared openings which fit over the squared shank portion 20 of the bolt, and are thereby held in position at right angles to each other. These straps are hardened steel, or at least the outer ends are hardened, and have extremities which are sharpened to bite into the soft steel of the pipe, these extremities being illustrated herein as provided with serrations 24 for this purpose. These two straps are initially bowed somewhat more than is indicated in Fig. 1 of the drawings, so that their ends do not extend quite to the walls of the pipe when the closure member is inserted therein.

On the bolt 19 above the bottom 15 of the closure member we mount a soft rubber or other gasket 25 and a metal washer 26. When the closure has been inserted into the end of a pipe and forced down to compress the gasket 18, we thread a nut 27 onto the exposed end of the bolt 19, thereby compressing the washer or gasket 25 to seal the opening in the bottom member 15 and to exert pressure upon the middle portions of the two straps 22 and 23, thereby flexing these straps against abutments furnished by the cup-shaped member 13 at the peripheral bottom surface thereof. The straps are thereby straightened, or the bowing of the same reduced, so as to force the serrations 24 into the metal of the pipe and in that manner securely lock the closure in position.

When the closure is to be removed at the time the pipe section is laid, it is necessary only to unscrew the nut 27, when the natural resiliency of the straps 22 and 23 causes them to resume their initially bowed condition, withdrawing their serrated ends from contact with the pipe wall, whereupon the closure can be readily withdrawn.

We have illustrated herein the pipe gripping means as a pair of spring metal straps, but obviously the form of this means may be varied considerably without departing from the spirit of the invention, and accordingly the term "strap" as used hereinafter is to be construed as applying to any form of spring metal member adapted to grip the wall of the pipe throughout any desired portion of its circumference.

We desire to state also that while we prefer to employ metals of such gauge that the straps 22 and 23 or their equivalent will flex without perceptibly affecting the dished part 15 of the cap, obviously the gauge of the metal used might be so changed that the flexure would take place in both of these parts more or less equally, or to a greater extent in the cap than in the gripping member or members.

Hence, while in the foregoing description and in the accompanying drawings, we have disclosed more or less in detail one particular embodiment of the invention, we desire it to be understood that such detail disclosure has been resorted to primarily for the purpose of fully illustrating the invention in accordance with the requirements of the statute, and that it is not to be construed as amounting to any limitation upon the scope of the invention.

Having thus described our invention, we claim:

1. In a device of the character described, a sheet metal cup-shaped closure member having an upwardly dished bottom, said bottom having a central opening therethrough, a bolt extending upwardly through said opening, a resilient clamping strap mounted upon said bolt beneath said bottom, said strap being sharpened at its ends, and a nut mounted upon the bolt above the said bottom, whereby the screwing down of the nut straightens the clamping strap without distorting the bottom of the cup.

2. In a device of the class described, a cup-shaped closure member adapted to be set into the end of an article having a cylindrical mouth, an outwardly extending annular flange on said member adapted to cover the end of said article, a pair of independent bowed resilient metal clamping straps beneath the closure member, the ends of said straps being adapted to grip the interior wall of said article, and engaging the cup-shaped closure member near the periphery of the bottom wall thereof, and means mounted upon the cup-shaped member at the center thereof and extending upwardly therethrough for exerting upward pressure upon the middle portions of both of said straps when the latter are set at an angle to each other, whereby the straps are straightened more or less and caused to grip the said article.

In testimony whereof, we hereunto affix our signatures.

WAYNE B. THOMAS.
VERNON L. SPRAGUE.